3,598,629
COLOR CATHODE-RAY TUBE
Carroll John Mellar and Nicholas Zeliotis, Chicago, Ill., assignors to Zenith Radio Corporation, Chicago, Ill.
No Drawing. Continuation-in-part of application Ser. No. 711,525, Mar. 8, 1968. This application Jan. 8, 1969, Ser. No. 789,942
Int. Cl. H01j 31/20
U.S. Cl. 117,33.5C                    7 Claims

ABSTRACT OF THE DISCLOSURE

The image area of a color cathode-ray tube is screened by a slurry process which is generally well known. The slurry has, as ingredients, a gadolinium oxide phosphor, an organic colloid or gel such as polyvinyl alcohol which may be sensitized so that its solubility may be influenced by actinic radiation, deionized water as a solvent and a sensitizer having a metal constituent and soluble in the solvent. Customarily, ammonium dichromate is used and, in solution, produces dichromate ions which may chemically and/or physically react with the polyvinyl alcohol and the phosphor. The slurry process is improved and the screenability of the slurry and the brightness of the color tube enhanced by including two additives in the slurry. The first is a polydentate chelating agent, such as ethylenediaminetetracetic acid, for reducing the reaction between the sensitizer, the polyvinyl alcohol and the phosphor in the dark, that is to say, in the absence of actinic radiation. The second is a base such as ammonia or an amine, which may have complexing properties, and which shifts the slurry to an alkaline pH more favorable to complexing action.

---

This application is a continuation-in-part of application Ser. No. 711,525, filed Mar. 8, 1968, now abandoned, and assigned to the assignee of the subject application.

BACKGROUND OF THE INVENTION

The present invention concerns an improvement in the screening of a color cathode-ray tube and is especially attractive in slurry screening which, as a general method, is well known.

In the usual process of slurry screening, a slurry is prepared including the desired phosphor, an organic gel such as polyvinyl alcohol and water or other liquid in which the gel is soluble. Ammonium dichromate or any other known sensitizer which is also soluble in water is added to the slurry to sensitize the polyvinyl alcohol to the end that its solubility may be changed by exposure to actinic radiation, such as ultraviolet light. The slurry is applied as a layer or coating over the screen area of the color tube which, at this stage in the fabrication of the tube, is a cap or terminating portion of the tube envelope separated from the funnel portion in order to permit screening. The cap, having been coated with the slurry, is placed in an exposure chamber and exposed to ultraviolet light through the shadow mask or whatever form of color selection device is desired to be used. This exposure causes selected elemental areas of the slurry to become insoluble so that washing of the cap with water develops the exposed areas, usually leaving a pattern of phopshor dots over the screen area.

Where the phosphor is of the zinc cadmium sulphide family or of the europium activated yttrium orthovanadate variety, this screening process enables the satisfactory production of color screens. However, there are other phosphors which are desirable for use in the manufacture of color cathode-ray tubes but which heretofore have not lent themselves acceptably well to screening particularly in the slurry process. Europium activated gadolinium oxide, for example, is a phosphor that has superior efficiency and brightness capabilities but prior to the process to be described herein has not yielded to conventional screening processes sufficiently well for commercial use.

Accordingly, it is an object of the invention to provide an improvement in the screening process of a color cathode-ray tube which permits screening with phosphors which, heretofore, have been difficult to apply.

It is another specific object of the invention to provide a method of improving both the screenability of phosphors in the manufacture of color cathode-ray tubes as well as the screen brightness of such tubes.

It is a further particular object of the invention to improve the screenability of rare earth phosphors, especially europium activated gadolinium oxide.

SUMMARY OF THE INVENTION

The invention concerns an improvement in the screenability of those phosphors which have previously been difficult to apply in conventional screening processes, for example, in slurry screening. As a general proposition, difficulty has been encountered where the coating composition includes not only the desired phosphor but also a sensitizer which, in solution, produces compound ions which in the absence of actinic radiation may undesirably react, chemically or physically, with the phosphor and the polyvinyl alcohol. The improvement in screenability and in brightness of the color tube, in accordance with the invention, comprises including as an additive for the coating a polydentate chelating agent for reducing the tendency of reaction between the sensitizer, the phosphor, the solvent and the gel.

In one specific aspect of the invention, commercially acceptable screenability of europium-activated gadodinium oxide is attained through the use of the salts of the chelating agent ethylenediamine tetracetic acid (hereinafter referred to for convenience by its popular title EDTA). EDTA is more effective in solutions when the pH is alkaline and, therefore, a second additive is employed to attain the desired pH value. This second additive may also have complexing and/or chelating properties. It is found that ammonium hydroxide may be used as the second additive although it is preferable to employ a water soluble amine which is not as volatile as ammonium hydroxide, providing it is compatible with the remainder of the slurry components.

DESCRIPTION OF PREFERRED EMBODIMENTS

The features of the present invention which are believed to be novel are set forth with particularly in the appended claims. The organization and sequence of performance of the steps of the inventive method, together with further objects and advantages thereof, may best be understood by reference to the following detailed description.

It has been known heretofore that europium-activated gadolinium oxide is intrinsically an efficient phosphor capable of superior brightness and studies have indicated the desirability of using this material as the red phosphor of a color cathode-ray tube. Its color coordinates are subject to control by adjusting the percent europium used in activating the phosphor. Measurements in the laboratory have established that gadolinium oxide, europium activated and having color coordinates corresponding to the red phosphors in commercial use, is distinctly brighter than such commercially used phosphors but laboratory experience has also shown that it has not been possible heretofore to screen with gadolinium oxide in processes, especially slurry processes, currently used in making color tubes in production. In particular, if gadolinium oxide is simply substituted for the phosphor ingredient of an otherwise conventional slurry, it is found that the screen yields are distinctly unsatisfactory. Where the tube is of the dot triad type, many of the phosphor dots wash off which, obviously, destroys the usefulness of the screen.

While the phenomenon is not thoroughly understood, it is believed that dot washoff is the result of an unwanted, so-called "dark reaction" in the slurry composition, that is to say, a reaction which takes place within the slurry in the absence of actinic radiation. Ideally, no reaction should occur in the slurry when held in the dark. The desired reaction which alters the solubility of the slurried film should take place only in the areas which are exposed to ultraviolet light in a pattern determined by the shadow mask. No reaction other than the desired solubilization change should occur. As a practical matter, however, it is found that phosphor slurry compositions are more or less subject to dark reactions attributable to complex reactions of the dichromate ions with the polyvinyl alcohol, dichromate ions reacting with the phosphor, and to the phosphor reacting with the polyvinyl alcohol and water. However, for phosphors used commercially today the dark reaction is so slow as to be of little or no consequence in the slurry screening process. By comparison, the reactivity of gadolinium oxide, used as the phosphor ingredient of the slurry, with the other components of the slurry is much greater and since these reactions in a gadolinium-oxide slurry are significantly faster, the dichromate ions are consumed by absorption to the phosphor before the screen bearing a coating of the slurry is introduced into the exposure chamber. Accordingly, there are insufficient dichromate ions available to support the desired chemical reaction when the slurry-coated screen is exposed to ultraviolet light. It is also likely that the organic colloid, the polyvinyl alcohol, has become partially spent due to the dark reaction and, therefore, is not as reactive as desired during the exposure. As a consequence, those portions of the slurry coating that are exposed are not rendered sufficiently insoluble and they wash off in the development step of the screening process. In addition, the adhesion to the glass substrate of those portions of the slurry which are rendered insoluble by ultraviolet exposure is greatly reduced.

Experimental evidence in support of this hypothesis is reflected in the change of pH of a freshly made slurry of gadolinium oxide which increased from 7 to 10 or 11 during the usual 1–4 hour aging period. It was also observed that under certain conditions the viscosity of the slurry inceased rapidly, up to 5 times its original value in the same period, indicating that the slurry cross-linked or reacted in the dark. And, finally, the addition of fresh quantities of dichromate immediately prior to the application of the slurry to screen area of the tube improved the formation of phosphor dots, some of which did not wash off in the developing process.

In attempting to improve the screenability of europium-activated gadolinium oxide in order to take advantage of its intrinsic brightness, ammonium hydroxide was added to the slurry with the object of converting the more reactive dichromate ions to chromate ions, in the following reaction:

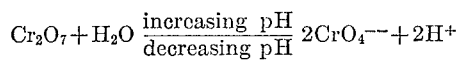

$$Cr_2O_7 + H_2O \xrightarrow[\text{decreasing pH}]{\text{increasing pH}} 2CrO_4^{--} + 2H^+$$

The chromate ions are milder or less reactive than the dichromate ions so the addition of ammonium hydroxide has an attenuating effect on the dark reaction. In addition, the ammonium hydroxide or other selected base shifts the pH of the slurry to a region that is more favorable to a complexing reaction by another recommended additive, specifically, a polydentate complexing, chelating or sequestering agent that is soluble in the solvent of the slurry.

Ideally, these additives slow down the dark reaction although, as a practical matter, this is not essential. It is sufficient that the additives slow down the dark reaction so that after a coating of slurry has been applied to the screen of the tube and the screen has been introduced into the exposure chamber, all of the essential ingredients are present in the necessary concentration for complete exposure and development to take place. Of course, a wide variety of chelating agents are known in the art and may be suited to the screening process; highly satisfactory results have been attained through the use of EDTA. Various forms of EDTA are suitable for use, for example, sodium, or potassium salts. The free acid theoretically could be used, however, at the pH at which EDTA can exist as the free acid, its complexing efficiency is greatly reduced.

Further experimentation has established that water-soluble amines such as butyl amine, isobutyl amine, propyl amine, isopropyl amine, mono-ethanol amine, di-ethanol amine, and triethanol amine may be beneficial. These amines give the slurry composition a desirable pH value to permit the chelating agent readily to produce stable complexes. Additionally, many of the amines have complexing properties which assist the chelating action. The preferable range of pH is 8 or 9 because EDTA chelates are more stable alkaline pH values. This range is recommended for gadolinium oxide slurry compositions.

Since EDTA is both well known and is commercially available, it is an acceptable additive to the slurry to accomplish the improvements of the present invention and, for the reasons recited, it is preferred to use a second additive to achieve a suitably high pH for the solution. If desired, a single additive may be used, chosen to convert the dichromate compound of the ammonium dichromate sensitizer to chromate compounds which have reduced activity or reaction with the gadolinium oxide phosphor. Preferably, the additive should have complexing properties to complex any interfering ions that may be formed. Among other complexing agents which might be employed and which are believed to have advantages for specific applications are: nitrilotriamine, citrates, tannates, oxalates, glyoximes, amino acids, organic amines such as butylamine, triethanol amine and the like.

Particular mention has been made of improving the screenability of gadolinium oxide phosphors, but it is fully expected that improvements are also attainable through the invention in respect of the screening of other rare earth phosphors such as the oxides of yttrium and lanthanum or oxysulfides of gadolinium or yttrium. It is also expected that phosphors, such as the rare earth orthovanadates which may be successfully screened without using the additives described above, may nevertheless benefit from their use. It has been found, for example, that using the chelating agent and another additive to establish the desired pH of the solution reduces the amount of ammonium dichromate very materially over the requirements of prior slurry formulations. Prior formulations typically utilize 0.6 gram of ammonium dichromate per pound of slurry whereas if the additives described above are employed the amount of sensitizer required is reduced to 0.2 gram per pound of slurry. This further contributes another very distinct advantage in that the brightness of the screen varies inversely with the amount of sensitizer and, accordingly, being able to reduce the quantity of ammonium dichromate in the slurry, enhances the brightness of the resulting screen.

Using the invention gives the further advantage of increasing storage life for the slurry composition. It is apparent that a production process which requires a continual preparation of the slurry composition is less attractive for large scale production than one wherein stored time for the slurry is available. With the benefits derived, particularly in using both additives to a slurry of gadolinium oxide as described, highly acceptable screening results are achieved even while allowing an aging period of as much as one week for the slurry composition. One successful slurry formulation included the following:

100 gr. $Gd_2O_3$: Eu (3–5%) phosphor
80 gr. D.I. water
0.5 cc. conc. $NH_4OH$
5 cc. di-sodium EDTA (0.15 molar in water)
Premix in ball mill Then add:

120 gr. PVA (10% aqueous solution)
100 cc. D.I. Water
2 cc. ammonium dichromate (20% aqueous solution)

The pH of the slurry was adjusted as necessary to 8–9 using ammonium hydroxide. The viscosity of the slurry was approximately 40 centipoise and the phosphor content was approximately 25 percent by weight. Screening with the slurry was accomplished with exposure times of the order of 7 minutes.

The protection against destructive amounts of dark reaction afforded by the addition of a Lewis base and/or the chelating additive appears to be essential to slurry screening with gadolinium oxide. It is also of value where the screening composition is required to have a storage life without deteriorating. Moreover, there are other screening processes, such as dusting, that may benefit from the teachings of the invention. In dusting, a layer of a screening composition, essentially the same as that of a slurry except for the phosphor ingredient, is applied to the screen area of a picture tube and the phosphor is added by dusting. If the coating layer is subject to an adverse reaction attributable to compound ions in the screening composition, relief may be obtained by the use of the additives discussed above to slow the reaction time.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

We claim:

1. In the process of screening a color cathode-ray tube in which the screen area is covered with a coating including the following ingredients:
   a phosphor,
   an organic gel capable of being sensitized so that its solubility is influenced by actinic radiation,
   a solvent for said gel,
   and a sensitizer for said gel which may chemically and/or physically react with said phosphor and said gel:
   the method of improving screenability of said phosphor and brightness of said color tube which comprises including as an additive in said coating a polydentate chelating agent chosen from the group consisting of ethylenediamine tetracetic acid, nitrilotriamine, butylamine and triethanol amine, which is soluble in said solvent, in an amount sufficient to reduce the tendency of reaction between said sensitizer, said phosphor, said solvent, and said gel.

2. The method in accordance with claim 1 in which said sensitizer is ammonium dichromate.

3. The method in accordance with claim 2 in which said chelating agent is in an alkaline solution having a pH in the range 8 to 9.

4. The method in accordance with claim 3 in which an amine, which is chosen from the group consisting of butylamine and triethanol amine, is soluble in said solvent and has also complexing properties, is added in sufficient concentration that the pH of the solution is approximately 7 to 10.

5. The method in accordance with claim 2 in which said chelating agent is a compound of the free acid of ethylenediamine tetracetic acid or its alkaline salts.

6. The method in accordance with claim 2 in which said coating is applied as a slurry, in which said phosphor ingredient is europium activated gadolinium oxide and in which said chelating agent is ethylenediamine tetracetic acid.

7. The method in accordance with claim 6 in which said solution contains, in addition to said chelating agent, ammonium hydroxide as a further additive.

References Cited

UNITED STATES PATENTS 3,342,594   9/1967   Kaplan _____ 96—36.1

ALFRED L. LEAVITT, Primary Examiner

W. F. CYRON, Assistant Examiner

U.S. Cl. X.R.

96—36.1; 252—301.3R